(12) United States Patent
Weissert et al.

(10) Patent No.: US 12,559,102 B2
(45) Date of Patent: Feb. 24, 2026

(54) METHOD FOR CONTROLLING AN APPROACH OF A VEHICLE, DISTANCE CONTROLLER, COMPUTER PROGRAM, AND MEMORY UNIT

(71) Applicant: Robert Bosch GmbH, Stuttgart (DE)

(72) Inventors: Martin Weissert, Eppingen (DE);
Thorsten Schori, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 486 days.

(21) Appl. No.: 17/830,649

(22) Filed: Jun. 2, 2022

(65) Prior Publication Data

US 2023/0001925 A1 Jan. 5, 2023

(30) Foreign Application Priority Data

Jun. 30, 2021 (DE) ..................... 10 2021 206 854.5

(51) Int. Cl.
*B60W 30/16* (2020.01)
(52) U.S. Cl.
CPC ....... *B60W 30/16* (2013.01); *B60W 2520/105* (2013.01); *B60W 2540/10* (2013.01); *B60W 2540/215* (2020.02); *B60W 2554/802* (2020.02); *B60W 2710/18* (2013.01)
(58) Field of Classification Search
CPC .................................................... B60W 30/16
See application file for complete search history.

(56) References Cited

U.S. PATENT DOCUMENTS

| | | | | |
|---|---|---|---|---|
| 9,068,516 B2 * | 6/2015 | Maruyama | ............ | F02D 11/105 |
| 11,608,060 B1 * | 3/2023 | Gutmann | .......... | B60W 60/0027 |
| 11,618,444 B2 * | 4/2023 | Foil | ................ | B60W 60/00274 |
| | | | | 701/26 |
| 11,731,653 B2 * | 8/2023 | Wolff | .................... | B60W 40/10 |
| | | | | 701/26 |
| 11,731,661 B2 * | 8/2023 | Costa | ..................... | G06V 20/58 |
| | | | | 701/301 |
| 11,733,369 B2 * | 8/2023 | Chen | ....................... | G01S 13/86 |
| | | | | 342/70 |
| 11,738,761 B2 * | 8/2023 | Li | .......................... | B60W 40/04 |
| | | | | 701/117 |
| 11,762,392 B2 * | 9/2023 | Gutmann | .......... | B60W 60/0013 |
| | | | | 701/25 |

(Continued)

FOREIGN PATENT DOCUMENTS

DE        102018201306 A1      8/2019

*Primary Examiner* — Jean Paul Cass
(74) *Attorney, Agent, or Firm* — NORTON ROSE FULBRIGHT US LLP

(57) ABSTRACT

A method for controlling an approach of a traveling vehicle to at least one preceding reference vehicle. The method includes using an automated distance setting between the vehicle and the reference vehicle, at an acceleration that may be applied for the vehicle and that is a function of an operating position of a control element of the vehicle that is actuatable by the driver of the vehicle, and that is associated with a temporal acceleration profile for the automated distance setting. A maximum highest acceleration value of the acceleration profile implementing the automated distance setting is specified as a function of the operating position. A distance controller, a computer program, and a memory unit are also described.

15 Claims, 3 Drawing Sheets

(56) References Cited

U.S. PATENT DOCUMENTS

| | | | |
|---|---|---|---|
| 11,780,461 B2 * | 10/2023 | Larsson | B60W 60/001 |
| | | | 701/25 |
| 11,794,776 B2 * | 10/2023 | Larsson | B60W 30/0956 |
| 2004/0046652 A1 * | 3/2004 | Yokoyama | B60T 13/66 |
| | | | 340/453 |
| 2015/0203108 A1 * | 7/2015 | Loria | B60W 50/0098 |
| | | | 701/1 |
| 2017/0072955 A1 * | 3/2017 | Ediger | B60W 30/143 |
| 2017/0341647 A1 * | 11/2017 | Rajvanshi | B60W 60/00274 |
| 2018/0134295 A1 * | 5/2018 | Gaither | B60W 50/0097 |
| 2019/0291726 A1 * | 9/2019 | Shalev-Shwartz | B60W 10/06 |
| 2020/0180633 A1 * | 6/2020 | Wu | B60W 30/18163 |
| 2020/0241541 A1 * | 7/2020 | McCawley | B60W 30/16 |
| 2020/0398836 A1 * | 12/2020 | Wu | B60W 30/16 |
| 2021/0197864 A1 * | 7/2021 | Oltmann | B60W 60/007 |
| 2023/0048774 A1 * | 2/2023 | Gupta | B60W 10/06 |
| 2023/0322208 A1 * | 10/2023 | Rojas | B60W 50/085 |
| | | | 701/41 |

* cited by examiner

METHOD FOR CONTROLLING AN APPROACH OF A VEHICLE, DISTANCE CONTROLLER, COMPUTER PROGRAM, AND MEMORY UNIT

CROSS REFERENCE

The present application claims the benefit under 35 U.S.C. § 119 of German Patent Application No. DE 10 2021 206 854.5 filed on Jun. 30, 2021, which is expressly incorporated herein by reference in its entirety.

FIELD

The present invention relates to a method according to for controlling an approach of a traveling vehicle to at least one preceding reference vehicle. Moreover, the present invention relates to a distance controller, to a computer program, and to a memory unit.

BACKGROUND INFORMATION

German Patent Application No. DE 10 2018 201 306 A1 describes a distance controller, which for determining the value of a target distance of a vehicle from a preceding reference vehicle reads in an accelerator pedal angle of an accelerator pedal of the vehicle. A target distance value is determined, using the read-in values. The target distance value is transmitted to an acceleration controller. An acceleration setpoint value is computed in a computing device of the acceleration controller, using the target distance value and the accelerator pedal angle. The setpoint acceleration value is read in by an activation device of the acceleration controller. In the activation device, the setpoint acceleration value is converted into a drive control signal for a drive of the vehicle, and/or into a brake signal for a braking system of the vehicle.

SUMMARY

According to an example embodiment of the present invention, a method for controlling an approach of a traveling vehicle to at least one preceding reference vehicle using an automated distance setting is provided. The automated distance setting for the approach process may thus better correspond to the expectations of the driver of the vehicle. The automated distance setting may take place more realistically and conveniently. The acceptance by the driver of the vehicle may increase, and the driving experience with the automated distance setting may be more natural. Via the operating position, the driver of the vehicle may appreciably influence the acceleration profile that may be applied to the distance setting in a more intuitive manner.

The vehicle may be a motor vehicle, a passenger car, a truck, a two-wheeled vehicle, or a comparable vehicle that moves on a roadway. The same applies for the reference vehicle. The reference vehicle may be traveling ahead of the vehicle in the same lane or in a lane adjacent to the lane of the vehicle.

During use of the method, the vehicle, in particular also the reference vehicle, is/are in forward movement.

"Approach" is preferably understood to mean a reduction in the distance between the vehicle and the reference vehicle along the travel direction.

The automated distance setting may involve an automated setting of the distance and/or an automated limitation of the distance between the vehicle and the reference vehicle in order to maintain at least a minimum distance. The automated distance setting may be associated with a driver-oriented assistance function, in particular dynamic distance assist (DDA). The function of a brake pedal of the vehicle for exerting the braking deceleration may be taken over at least partially, preferably completely, in the automated distance setting.

An acceleration profile is understood to mean a temporal profile of acceleration values of the vehicle. The acceleration profile may be the temporal profile of the acceleration of the vehicle during the approach. The maximum possible highest acceleration value may be reached in the acceleration profile during the approach. For a new approach to a next reference vehicle, a new acceleration profile may be present, with which a new maximum possible highest acceleration value is once again associated as a function of the operating position existing at that time.

The highest acceleration value may be variable during the approach, as a function of the operating position. The approach process, which has for example already begun, may thus be adapted to the driver intent as a function of the operating position.

The operating position may include a deflection position of the control element as well as a deflection speed of the control element. A larger operating position may request a greater traveling speed of the vehicle than a smaller operating position. A larger operating position may correspond to a greater deflection of the control element and/or to a greater deflection speed of the control element.

In one preferred example embodiment of the present invention, it is advantageous if the acceleration is a braking deceleration, and the acceleration profile is a braking deceleration profile.

The braking deceleration corresponds to a negative acceleration. The approach may be carried out both by positive accelerations and by negative accelerations.

In one preferred example embodiment of the present invention, it is advantageous if the highest acceleration value is a maximum acceleration and/or a maximum acceleration gradient of the acceleration. The maximum acceleration and/or the maximum acceleration gradient are/is preferably negative for implementing the braking deceleration.

In one preferred example embodiment of the present invention, it is provided that the maximum possible highest acceleration value (am) is changed as a function of an assessment of a hazardous situation. The hazardous situation may occur during the approach. The hazardous situation may be a condition that impairs the driving safety of the vehicle and/or the safety of the surroundings of the vehicle on account of the vehicle. When a hazardous situation is recognized, the maximum possible highest acceleration value may be increased up to an extreme highest acceleration value for subsequently avoiding the hazardous situation. The assessment of the hazardous situation may take place during the approach and via the automated distance setting.

In one advantageous example embodiment of the present invention, it is provided that the control element is an accelerator pedal, and the operating position is an accelerator pedal position. The control element may control a drive torque that is present at the vehicle wheels for moving the vehicle. The accelerator pedal position may be described by an accelerator pedal angle. The operating position may be a deflection of the control element and/or a temporal change of the deflection of the control element.

In one particular example embodiment of the present invention, it is advantageous if an acceleration profile for a first operating position has a smaller acceleration at a first point in time, and at a subsequent, second point in time has a greater acceleration than for a second operating position in each case at the corresponding points in time. In this way, an acceleration profile for the approach may be adaptively set as a function of the operating position while still meeting the requirements for a minimum distance between the vehicle and the reference vehicle.

The maximum highest acceleration value of the acceleration profile may be greater the larger the operating position, and may be smaller the smaller the operating position. The maximum acceleration gradient of the acceleration profile may be smaller the smaller the operating position, and greater the larger the operating position. An operating position that is smaller during the approach may trigger a braking operation that begins early, in which a smaller maximum highest acceleration value is used which starts with an initially greater braking deceleration, but which overall has only a smaller maximum braking deceleration, corresponding to a smaller highest acceleration value, than when the operating position is larger.

One preferred example embodiment of the present invention is advantageous in which the first operating position is larger than the second operating position, and the highest acceleration value is greater for the first operating position than for the second operating position. For example, an accelerator pedal that is actuated by the driver during the approach may trigger a temporally delayed braking operation, corresponding to the first operating position, which upon approaching a predefined minimum distance is also more intense, if necessary, due to the greater highest acceleration value. An accelerator pedal that is released during the approach may trigger a braking operation that begins early, in which a smaller highest acceleration value is used which starts with an initially greater braking deceleration, but which may also conclude only with a smaller maximum possible braking deceleration corresponding to the smaller highest acceleration value.

Furthermore, according to an example embodiment of the present invention, a distance controller is provided which is configured to indirectly or directly carry out the method having at least one of the features stated above. The distance controller may be implemented in a control unit of the vehicle. The control unit may be situated in the vehicle. The distance controller may carry out the method directly, for example, if it controls the automated distance setting. The distance controller may carry out the method indirectly, for example, if an acceleration controller is provided downstream which controls the automated distance setting as a function of the output of the distance controller and optionally further parameters.

Driving properties of the vehicle when traveling on a curve may be additionally taken into account in the distance controller or a downstream adjustment device on the input side. Furthermore, the distance controller or the adjustment device, for example the acceleration controller, on the input side may take into account an actual speed of the vehicle, a differential speed between the vehicle and the reference vehicle, an actual distance between the vehicle and the reference vehicle, and/or a setpoint distance between the vehicle and the reference vehicle.

The automated distance setting may involve a detection of the surroundings by the vehicle. For example, a distance between the vehicle and the reference vehicle may be measured by a distance sensor, for example a radar sensor, a camera, and/or a LIDAR sensor.

Moreover, according to the present invention a computer program is provided that includes machine-readable instructions that are executable on at least one computer, the above-described method running when the instructions are executed.

In addition, according to the present invention a memory unit is provided which has a machine-readable design and that is accessible by at least one computer, and on which the described computer program is stored.

Further advantages and advantageous embodiments of the present invention result from the description of the figures, and the figures.

BRIEF DESCRIPTION OF THE DRAWINGS

The present invention is described in greater detail below with reference to the figures.

DETAILED DESCRIPTION OF EXAMPLE EMBODIMENTS

Figure 1:
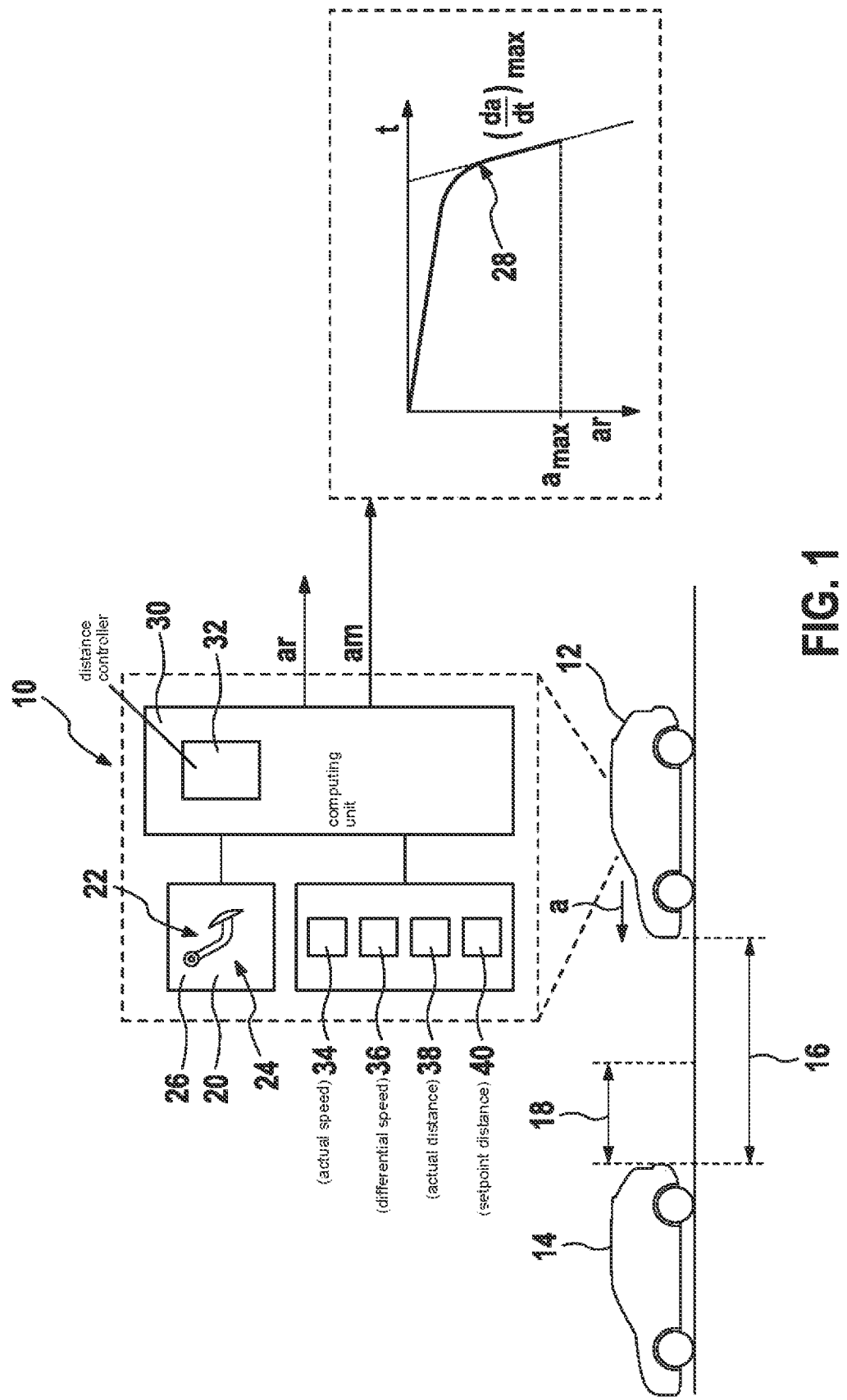
FIG. 1 shows a method for controlling an approach of a vehicle in one particular specific example embodiment of the present invention.

FIG. 1 shows a method for controlling an approach of a vehicle in one particular specific embodiment of the present invention. Method 10 for controlling an approach of a traveling vehicle 12 to at least one preceding reference vehicle 14 is carried out using an automated distance setting of a distance 16 between vehicle 12 and reference vehicle 14. The automated distance setting is implemented at an acceleration a that may be applied for vehicle 12, via which distance 16 between vehicle 12 and reference vehicle 14 is influenced, for example decreased. Acceleration a may be negative and may act as braking deceleration. If traveling vehicle 12 approaches preceding reference vehicle 14 at a greater speed than that of reference vehicle 14, via the automated distance setting a deceleration of vehicle 12 may take place via the braking deceleration for maintaining a smallest minimum distance 18 as a safety distance between vehicle 12 and reference vehicle 14.

In method 10, a setpoint acceleration ar, here in particular the braking deceleration, that specifies an acceleration a to be applied for vehicle 12 for the automated distance setting is set as a function of an operating position 20 of a control element 22 of vehicle 12 that is actuatable by the driver of vehicle 12. Control element 22 may be an accelerator pedal 24 of vehicle 12, and operating position 20 may be an accelerator pedal position 26 that may be described by an accelerator pedal angle. A large accelerator pedal angle corresponds in particular to a large deflection of accelerator pedal 24, and thus to a large operating position 20.

Setpoint acceleration ar, in the present case the braking deceleration, which is specified for the automated distance setting and which corresponds to a negative acceleration, follows a temporal acceleration profile 28 during the automated distance setting, which is preferably a braking deceleration profile and which describes the temporal profile of the predefined braking deceleration for the automated distance setting between vehicle 12 and reference vehicle 14.

In addition to operating position 20 of control element 22, for computing setpoint acceleration ar in a computing unit 30 that includes at least one distance controller 32, it is also possible to take into account on the input side an actual speed 34 of vehicle 12, a differential speed 36 between vehicle 12 and reference vehicle 14, an actual distance 38 between vehicle 12 and reference vehicle 14, and/or a setpoint distance 40 between vehicle 12 and reference vehicle 14. Setpoint acceleration ar is output by computing unit 30.

In method 10, for the automated distance setting, operating position 20 is used during the approach in order to change a maximum possible highest acceleration value am, which has a limiting effect for acceleration profile 28. Highest acceleration value am of acceleration profile 28 is thus a function of operating position 20. Highest acceleration value am may be a maximum acceleration $a_{max}$ and/or a maximum acceleration gradient $$\left(\frac{da}{dt}\right)_{max}$$

of setpoint acceleration ar, and may be output by computing unit 30. Maximum possible acceleration $a_{max}$ and/or maximum possible acceleration gradient $$\left(\frac{da}{dt}\right)_{max}$$

for acceleration profile 28 that is applied during the approach may be limited in this way.

Figures 2, 3:
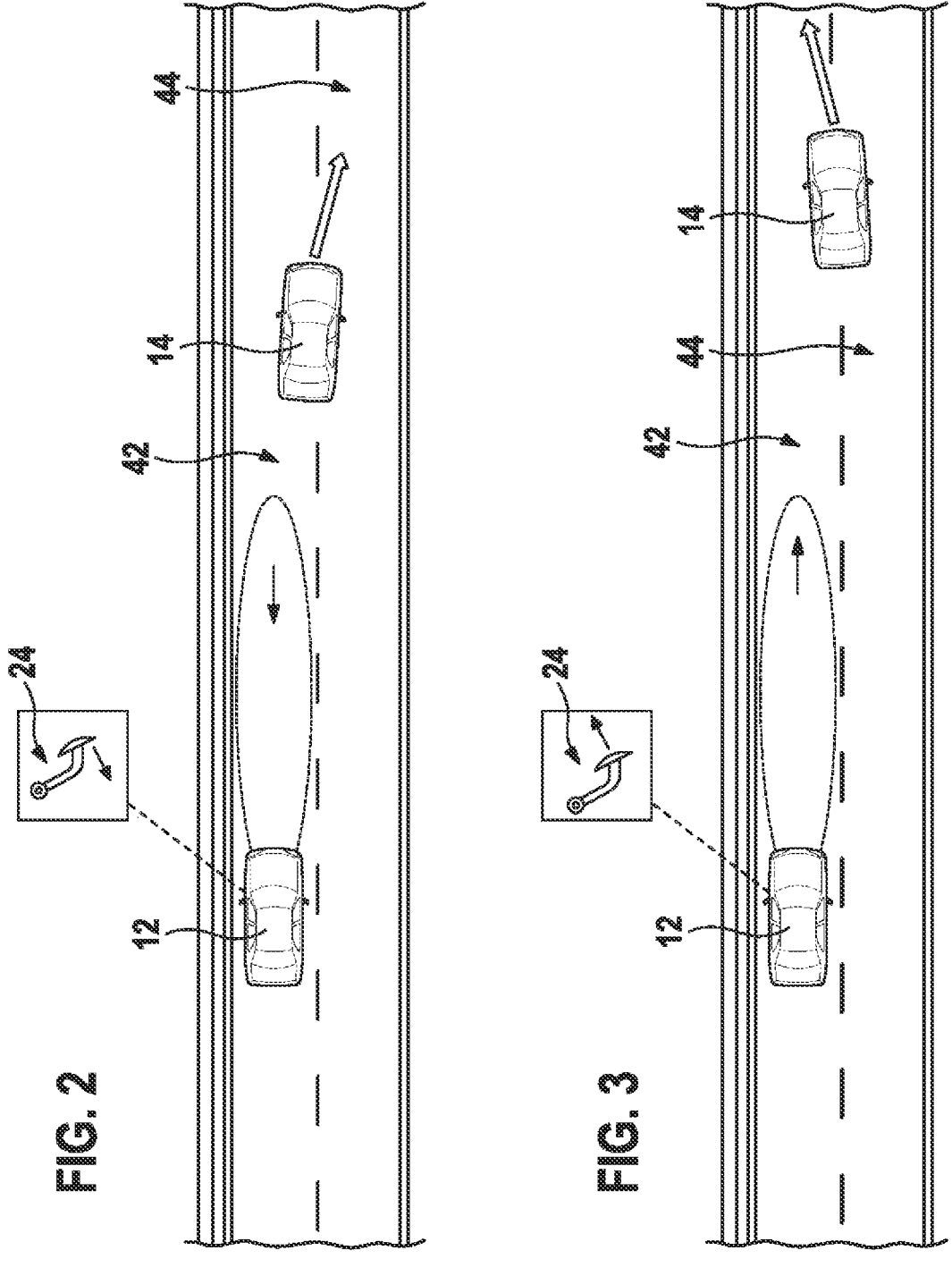
FIG. 2 shows a driving situation of a vehicle upon approaching a preceding reference vehicle.
FIG. 3 shows a further driving situation of a vehicle upon approaching a preceding reference vehicle.

The advantages and properties of method 10 from FIG. 1 are illustrated with reference to FIGS. 2 and 3, described below. FIG. 2 shows a driving situation of vehicle 12 in which preceding reference vehicle 14 is traveling more slowly than vehicle 12 and is veering out of lane 42, on which vehicle 12 is located, into a neighboring lane 44. Since the driver of vehicle 12 notices the veering operation of reference vehicle 14 and would like to preferably maintain or even increase his/her speed, the driver leaves accelerator pedal 24 actuated.

The automated distance setting between vehicle 12 and reference vehicle 14, which is still blocking lane 42 but is veering out of it, allows a braking deceleration that is initially set to be small during the approach, since the driver would like to reduce his/her speed as little as possible, which is detected as an operating position based on accelerator pedal position 26, and in the method according to FIG. 1 is used on the input side. At the same time, this accelerator pedal position 26 sets a highest acceleration value, for example a maximum acceleration and/or a maximum acceleration gradient, which allows the initially small braking deceleration, and allows a large maximum acceleration and/or a large maximum acceleration gradient of the braking deceleration upon a further or critical approach to reference vehicle 14. For example, the maximum acceleration and/or the maximum acceleration gradient of the braking deceleration may be required if reference vehicle 14 instead returns to lane 42, contrary to the indicated veering movement, or if the veering operation is carried out more slowly than indicated. However, due to the set highest acceleration value, the approach process could still be carried out safely, preferably to maintain the minimum distance. The braking operation for maintaining the minimum distance may thus begin later, but carried out more intensely if necessary, and thus temporally shortened overall.

In comparison, FIG. 3 depicts a driving situation in which it is apparent that a preceding reference vehicle 14 in neighboring lane 44 is veering into lane 42 that vehicle 12 is traveling in, and at a greater distance from the vehicle than the setpoint distance between the vehicle and the reference vehicle. If this movement of reference vehicle 14, via which reference vehicle 14 travels in front of vehicle 12 in lane 42, and blocking lane 42, is recognized early by the driver of vehicle 12, the typical behavior is to let up on accelerator pedal 24. Due to the dependency of the highest acceleration value, in particular the maximum acceleration gradient, on the operating position of accelerator pedal 24, at the start of the approach of vehicle 12 to reference vehicle 14, an earlier and greater braking deceleration may thus be set than in the driving situation from FIG. 2. This is because for this accelerator pedal position, which corresponds to a smaller operating position than in the driving situation in FIG. 2, the highest acceleration value, in particular the maximum acceleration gradient, is set to be smaller, and for the braking deceleration profile that arises, allows a smaller braking deceleration and/or a smaller acceleration gradient of the braking deceleration in order to increase the driving comfort and allow a more natural driving experience with the vehicle.

A braking operation that takes place at short notice and just before the minimum distance may be carried out with a greater braking deceleration when the control element is released. By letting up on the accelerator pedal, the driver intent for a braking deceleration is confirmed, and this may also be carried out via an increased maximum braking deceleration to prevent running up on a vehicle that is veering in a short distance ahead.

Thus, in order to not fall below the minimum distance between vehicle 12 and reference vehicle 14, the approach is initiated with a braking deceleration that is greater than for the driving situation from FIG. 2. The desired acceleration gradient of the braking deceleration is smaller than for the driving situation from FIG. 2. Upon an advancing approach and reaching a minimum distance, the automated distance setting is more greatly limited with regard to the highest acceleration value than for the driving situation from FIG. 2. This control of the approach with a prolonged and weaker braking operation also corresponds to natural driving behavior, in which the speed of vehicle 12 is reduced early if an obstacle moving at a slower speed should appear in lane 42. However, for hazardous situations with the vehicle, a smaller operating position, for example releasing the control element, may trigger a greater braking deceleration, corresponding to the driver intent after a braking deceleration.

Figure 4:
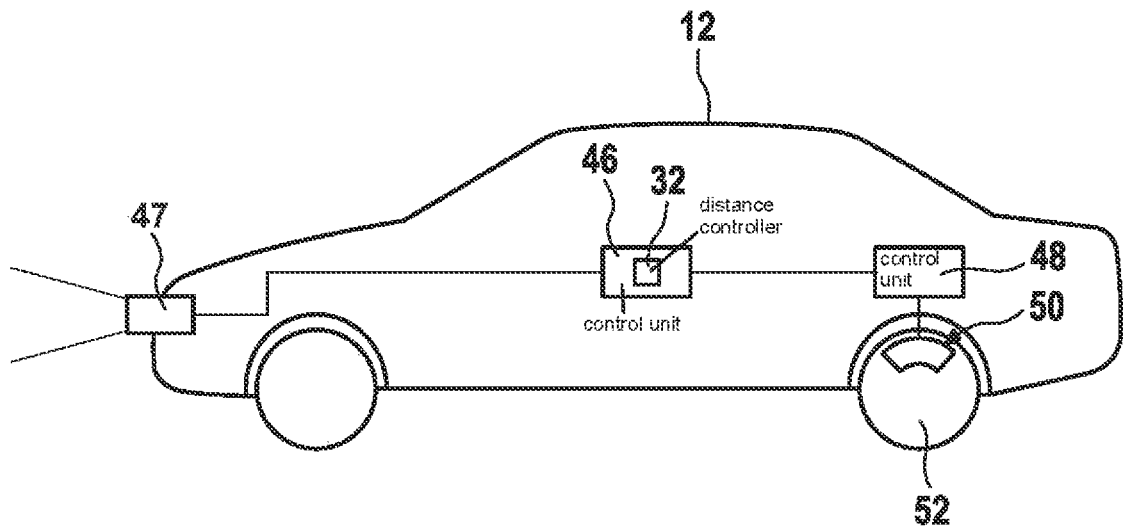
FIG. 4 shows a vehicle including a distance controller in one particular specific example embodiment of the present invention.

FIG. 4 shows a vehicle including a distance controller in one particular specific embodiment of the present invention. Vehicle 12 includes a control unit 46 with which distance controller 32 is associated for computing the setpoint acceleration, in particular the braking deceleration and the highest acceleration value, during approach of vehicle 12 to a preceding reference vehicle by applying an automated distance setting. On the input side, distance controller 32 may take into account an actual speed of vehicle 12, a differential speed between vehicle 12 and the reference vehicle, an actual distance between vehicle 12 and the reference vehicle, and/or a setpoint distance between vehicle 12 and the reference vehicle. The actual distance may be measured by a distance sensor 47, for example a radar sensor, a camera, and/or a LIDAR sensor.

The setpoint acceleration that is output by distance controller 32 may be output to a control unit 48 that controls a braking device 50 which provides the braking action to vehicle wheels 52 for the braking deceleration.

What is claimed is:

1. A method for controlling an approach of a traveling vehicle to a preceding reference vehicle, the method comprising:

monitoring an actuation, by a driver of the traveling vehicle, of a pedal of the traveling vehicle, wherein the monitoring includes identifying, from among a plurality of possible actuation values of an actuation variable representing a degree of pedal actuation, a present actuation value that corresponds to (i) present angle of depression of the pedal or (ii) a present rate of change of the angle of depression of the pedal;

based on the identified present actuation value, determined in the monitoring, setting at least one of a maximum value of a deceleration and a maximum gradient of the deceleration;

selecting, based on the setting, one of a plurality of deceleration profiles that each defines a change in a value of the deceleration, from among a plurality of possible values of the deceleration, over time according to one or both of the following two conditions (i)-(ii):

(i) (a) at a first point in time, the selected deceleration profile defines an inverse monotonic functional relationship between the plurality of possible actuation values and the values of the deceleration, such that the value of the deceleration that the selected deceleration profile defines for a first actuation value of the plurality of possible actuation values is lower than the value of the deceleration that the selected deceleration profile defines for a second actuation value of the plurality of possible actuation values that is lower than the first actuation value, and (b) at a second point in time that temporally follows the first point in time, the selected deceleration profile defines a direct monotonic functional relationship between the plurality of possible actuation values and the values of the deceleration, such that the value of the deceleration that the selected deceleration profile defines for the first actuation value of the plurality of possible actuation values is higher than the value of the deceleration that the selected deceleration profile defines for the second actuation value of the plurality of possible actuation values; and (ii) (a) at the first point in time, the selected deceleration profile defines an inverse monotonic functional relationship between the plurality of possible actuation values and a plurality of possible values of the gradient of the deceleration, such that a value of the gradient, from the plurality of possible values of the gradient, that the selected deceleration profile defines for the first actuation value is lower than a value of the gradient, from the plurality of possible values of the gradient, that the selected deceleration profile defines for the second actuation value that is lower than the first actuation value, and (b) at the second point in time that temporally follows the first point in time, the selected deceleration profile defines a direct monotonic functional relationship between the plurality of possible actuation values and the plurality of possible values of the gradient of the deceleration, such that the value of the gradient that the selected deceleration profile defines for the first actuation value is higher than the value of the gradient that the selected deceleration profile defines for the second actuation value; and controlling a deceleration of the traveling vehicle to maintain a predefined minimum distance from the preceding reference vehicle, wherein the controlling is performed (i) based at least in part on a distance of the traveling vehicle from the preceding reference vehicle, which is measured by a sensor system of the traveling vehicle, and (ii) with consideration of the deceleration value that the selected one of the deceleration profiles defines for the identified present actuation value.

2. The method as recited in claim 1, wherein the set maximum is the maximum value of the deceleration.

3. The method as recited in claim 1, wherein the set maximum is changed as a function of an assessment of a hazardous situation.

4. The method as recited in claim 1, wherein the pedal is an accelerator pedal.

5. A distance controller comprising:

a processor, wherein the processor is programmed to control an approach of a traveling vehicle to a preceding reference vehicle, the control including:

monitoring an actuation, by a driver of the traveling vehicle, of a pedal of the traveling vehicle, wherein the monitoring includes identifying, from among a plurality of possible actuation values of an actuation variable representing a degree of pedal actuation, a present actuation value that corresponds to (i) a present angle of depression of the pedal or (ii) a present rate of change of the angle of depression of the pedal;

based on the identified present actuation value, determined in the monitoring, setting at least one of a maximum value of a deceleration and a maximum gradient of the deceleration;

selecting, based on the setting, one of a plurality of deceleration profiles that each defines a change in a value of the deceleration, from among a plurality of possible values of the deceleration, over time according to one or both of the following two conditions (i)-(ii):

(i) (a) at a first point in time, the selected deceleration profile defines an inverse monotonic functional relationship between the plurality of possible actuation values and the values of the deceleration, such that the value of the deceleration that the selected deceleration profile defines for a first actuation value of the plurality of possible actuation values is lower than the value of the deceleration that the selected deceleration profile defines for a second actuation value of the plurality of possible actuation values that is lower than the first actuation value, and (b) at a second point in time that temporally follows the first point in time, the selected deceleration profile defines a direct monotonic functional relationship between the plurality of possible actuation values and the values of the deceleration, such that the value of the deceleration that the selected deceleration profile defines for the first actuation value of the plurality of possible actuation values is higher than the value of the deceleration that the selected deceleration profile defines for the second actuation value of the plurality of possible actuation values; and (ii) (a) at the first point in time, the selected deceleration profile defines an inverse monotonic functional relationship between the plurality of possible actuation values and a plurality of possible values of the gradient of the deceleration, such that a value of the gradient, from the plurality of possible values of the gradient, that the selected deceleration profile defines for the first actuation value is lower than a value of the gradient, from the plurality of possible values of the gradient, that the selected deceleration profile defines for the second actuation value that is lower than the first actuation value, and (b) at the second point in time that temporally follows the first point in time, the selected deceleration profile defines a direct monotonic functional relationship between the plurality of possible actuation values and the plurality of possible values of the gradient of the deceleration, such that the value of the gradient that the selected deceleration profile defines for the first actuation value is higher than the value of the gradient that the selected deceleration profile defines for the second actuation value; and controlling a deceleration of the traveling vehicle to maintain a predefined minimum distance from the preceding reference vehicle, wherein the controlling is performed (i) based at least in part on a distance of the traveling vehicle from the preceding reference vehicle, which is measured by a sensor system of the traveling vehicle, and (ii) with consideration of the deceleration value that the selected one of the deceleration profiles defines for the identified present actuation value.

6. A non-transitory machine-readable memory medium on which is stored a computer program for controlling an approach of a traveling vehicle to a preceding reference vehicle, the computer program, when executed by one or more computers, causing the one or more computers to perform the following:

monitoring an actuation, by a driver of the traveling vehicle, of a pedal of the traveling vehicle, wherein the monitoring includes identifying, from among a plurality of possible actuation values of an actuation variable representing a degree of pedal actuation, a present actuation value that corresponds to (i) a present angle of depression of the pedal or (ii) a present rate of change of the angle of depression of the pedal;

based on the identified present actuation value, determined in the monitoring, setting at least one of a maximum value of a deceleration and a maximum gradient of the deceleration;

selecting, based on the setting, one of a plurality of deceleration profiles that each defines a change in a value of the deceleration, from among a plurality of possible values of the deceleration, over time according to one or both of the following two conditions (i)-(ii):

(i) (a) at a first point in time, the selected deceleration profile defines an inverse monotonic functional relationship between the plurality of possible actuation values and the values of the deceleration, such that the value of the deceleration that the selected deceleration profile defines for a first actuation value of the plurality of possible actuation values is lower than the value of the deceleration that the selected deceleration profile defines for a second actuation value of the plurality of possible actuation values that is lower than the first actuation value, and (b) at a second point in time that temporally follows the first point in time, the selected deceleration profile defines a direct monotonic functional relationship between the plurality of possible actuation values and the values of the deceleration, such that the value of the deceleration that the selected deceleration profile defines for the first actuation value of the plurality of possible actuation values is higher than the value of the deceleration that the selected deceleration profile defines for the second actuation value of the plurality of possible actuation values; and (ii) (a) at the first point in time, the selected deceleration profile defines an inverse monotonic functional relationship between the plurality of possible actuation values and a plurality of possible values of the gradient of the deceleration, such that a value of the gradient, from the plurality of possible values of the gradient, that the selected deceleration profile defines for the first actuation value is lower than a value of the gradient, from the plurality of possible values of the gradient, that the selected deceleration profile defines for the second actuation value that is lower than the first actuation value, and (b) at the second point in time that temporally follows the first point in time, the selected deceleration profile defines a direct monotonic functional relationship between the plurality of possible actuation values and the plurality of possible values of the gradient of the deceleration, such that the value of the gradient that the selected deceleration profile defines for the first actuation value is higher than the value of the gradient that the selected deceleration profile defines for the second actuation value; and controlling a deceleration of the traveling vehicle to maintain a predefined minimum distance from the preceding reference vehicle, wherein the controlling is performed (i) based at least in part on a distance of the traveling vehicle from the preceding reference vehicle, which is measured by a sensor system of the traveling vehicle, and (ii) with consideration of the deceleration value that the selected one of the deceleration profiles defines for the identified present actuation value.

7. The method as recited in claim 1, wherein the set maximum is the maximum gradient of the deceleration.

8. The method as recited in claim 1, wherein the selecting is performed according to the conditions that the greater the actuation value, (a) the lower is the value of the deceleration at the particular first point in time, and (b) the greater is the value of the deceleration at the particular second point in time that temporally follows the first point in time.

9. The method as recited in claim 8, wherein the selecting is performed according to a further condition that the greater the actuation value, the greater is the maximum value of the deceleration reached over the entirety of the selected deceleration profile.

10. The method as recited in claim 1, wherein the selecting is performed according to the conditions that the greater the actuation value, (a) the lower is the value of the gradient of the deceleration at the particular first point in time, and (b) the greater is the value of the gradient of the deceleration at the particular second point in time that temporally follows the first point in time.

11. The method as recited in claim 10, wherein the selecting is performed according to a further condition that the greater the actuation value, the greater is the maximum value of the gradient of the deceleration reached over the entirety of the selected deceleration profile.

12. The method as recited in claim 1, wherein the selecting is performed according to the conditions that the greater the actuation value, (a) the lower are both the value of the deceleration and the value of the gradient of the deceleration at the particular first point in time, and (b) the greater are both the value of the deceleration and the value of the gradient of the deceleration at the particular second point in time that temporally follows the first point in time.

13. The method as recited in claim 12, wherein the selecting is performed according to further conditions that the greater the actuation value, the greater are both the maximum value of the deceleration reached over the entirety of the selected deceleration profile and the maximum value of the gradient of the deceleration reached over the entirety of the selected deceleration profile.

14. The method as recited in claim 1, wherein the actuation value is the value of the angle of depression to which the driver depresses the pedal.

15. The method as recited in claim 1, wherein the actuation value is the value of the rate at which the driver depresses the pedal.

* * * * *